B. CONVERSE.
Blowing Device for Smoke-Stacks.

No. 214,024.   Patented April 8, 1879.

Witnesses.
C. H. Woodward
J. F. Orcutt

Blinn Converse,
Inventor, By
Louis Feeser & Co,
Attys.

UNITED STATES PATENT OFFICE.

BLINN CONVERSE, OF ST. JAMES, MINNESOTA.

IMPROVEMENT IN BLOWING DEVICES FOR SMOKE-STACKS.

Specification forming part of Letters Patent No. 214,024, dated April 8, 1879; application filed December 5, 1878.

*To all whom it may concern:*

Be it known that I, BLINN CONVERSE, of St. James, in the county of Watonwan and State of Minnesota, have made certain new and useful Improvements in Blowing Devices for Smoke-Stacks, which improvements are fully set forth in the following specification and accompanying drawings, in which—

Figure 1:
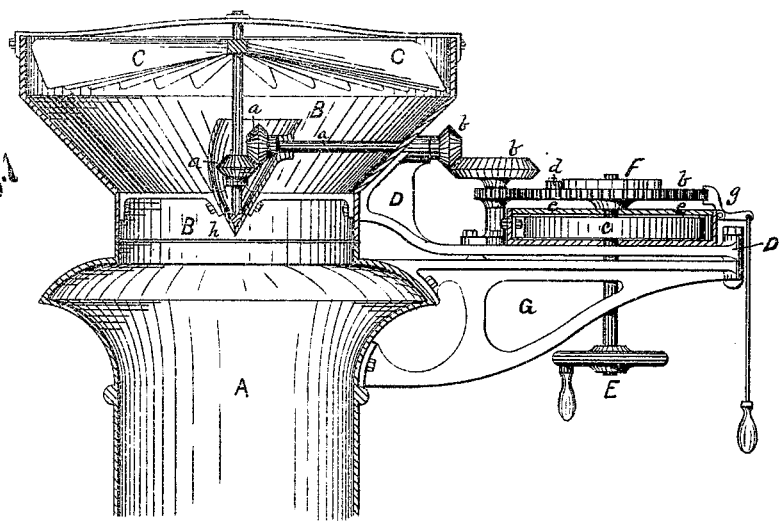
Figure 2:
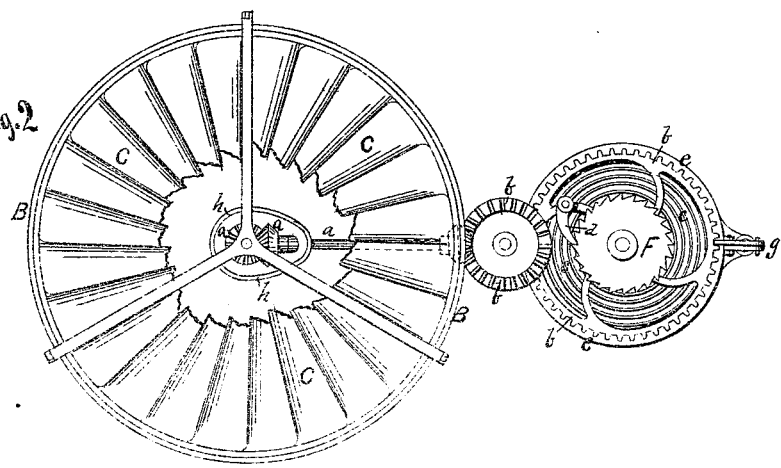

Figure 1 is a sectional side elevation of a portion of the top of a smoke-stack with my improvements attached thereto; and Fig. 2 is a plan view of the same, with a portion of the center of the fan broken out to show interior.

This invention relates to the smoke-stacks of steam-boilers, more particularly those used on steam fire-engines; and consists in a fan-wheel arranged over the top of the stack, and operated by a spring or equivalent mechanism to act as a blower to form an artificial draft when the fire is first started, to accelerate the combustion and reduce the time necessary to raise the steam, as hereinafter set forth.

In the ordinary arrangement of boilers, where the natural motion of the atmosphere is depended upon to blow the fire, some time must elapse before the air in the flues is sufficiently heated to pass off, and thus cause a draft through the fire; and in steam fire-engines, where a few seconds of time are frequently so very important, this is a serious matter; but by attaching an artificial blower to the stack, which will cause a strong draft through the fire-box and flues even before the fire is started, a great advantage will be gained by the saving of valuable time.

To accomplish this I attach to the top of the smoke-stack A a flaring bonnet or hood, B, in which a fan-wheel, C, is mounted, and which is connected by gearing and shafting *a b* to a coiled spring, *c*, in a box, *e*, upon a frame, D. This spring is provided with a crank or wheel, E, and ratchet-wheel F upon the shaft to which it is secured, and a dog, *d*, upon the first gear-wheel, *b*, whereby it may be wound up; and *g* is a dog secured upon the frame D, in any suitable manner, to mesh into one of the teeth of the wheel *b*, or in any suitable manner upon any other part of the mechanism, to hold the spring after it is wound up. This dog will be so arranged that by untripping it the spring will be released and allowed to act upon the fan-wheel.

The gears will be "speeded up," so that the fan will be made to revolve very fast, to increase its effect upon the fire.

The frame D will be so mounted upon a second frame, G, that the fan-wheel C and hood B may be turned off to one side, or otherwise removed from over the smoke-stack, after the steam is raised sufficiently high to employ the steam-blower or the exhaust from the engine.

The spring may be made of any desired form or arranged with any desired number of gears or equivalent devices. It may be so arranged that it may be rewound while the fan is in motion, so that the fan may be kept in motion a longer time than the length of the spring will allow, and thus keep up the artificial draft for any desired length of time.

The fan will be made of a larger diameter than the smoke-stack, so as to still further increase its power.

A covering, *h*, will be arranged in the interior of the hood B around the gearing, to protect it from the heat.

I am aware that it is not new to arrange a fan-wheel in a smoke-stack, as I am aware that such devices have heretofore been used; but so far as I am aware such devices have not been used and operated by mechanical means independently of the motion of the atmosphere, either inside or outside of the stack or chimney.

Having thus described my invention, what I claim as new, and desire to secure by Letters Patent, is—

The combination, with a smoke-stack, of a fan-wheel, C, mounted in a flaring movable hood or bonnet, B, pivoted to frame G, and adapted to be removed laterally from the top of the smoke-stack at pleasure, substantially as hereinbefore set forth.

In testimony whereof I have hereunto set my hand in the presence of two subscribing witnesses.

BLINN CONVERSE.

Witnesses:
C. N. WOODWARD,
J. J. THORNTON.